United States Patent
Chao et al.

(10) Patent No.: US 12,159,622 B2
(45) Date of Patent: *Dec. 3, 2024

(54) TEXT INDEPENDENT SPEAKER RECOGNITION

(71) Applicant: GOOGLE LLC, Mountain View, CA (US)

(72) Inventors: Pu-sen Chao, Los Altos, CA (US); Diego Melendo Casado, Mountain View, CA (US); Ignacio Lopez Moreno, New York, NY (US); Quan Wang, Hoboken, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,476

(22) Filed: Dec. 9, 2022

(65) Prior Publication Data

US 2023/0113617 A1    Apr. 13, 2023

Related U.S. Application Data

(63) Continuation of application No. 17/046,994, filed as application No. PCT/US2019/063927 on Dec. 2, 2019, now Pat. No. 11,527,235.

(Continued)

(51) Int. Cl.
*G10L 15/22* (2006.01)
*G10L 15/06* (2013.01)
(Continued)

(52) U.S. Cl.
CPC .......... *G10L 15/063* (2013.01); *G10L 15/07* (2013.01); *G10L 15/22* (2013.01); *G10L 15/32* (2013.01);
(Continued)

(58) Field of Classification Search
None
See application file for complete search history.

(56) References Cited

U.S. PATENT DOCUMENTS

| 5,897,616 | A  | 4/1999 | Kanevsky et al. |
| 9,711,148 | B1 | 7/2017 | Sharifi et al. |
| | | (Continued) | |

FOREIGN PATENT DOCUMENTS

| CN | 102737633 | 10/2012 |
| CN | 103456304 | 12/2013 |
| | (Continued) | |

OTHER PUBLICATIONS

European Patent Office; Intention to Grant issued in Application No. 21180020.6; 54 pages; dated Apr. 28, 2023.

(Continued)

*Primary Examiner* — Neeraj Sharma
(74) *Attorney, Agent, or Firm* — Gray Ice Higdon

(57) ABSTRACT

Text independent speaker recognition models can be utilized by an automated assistant to verify a particular user spoke a spoken utterance and/or to identify the user who spoke a spoken utterance. Implementations can include automatically updating a speaker embedding for a particular user based on previous utterances by the particular user. Additionally or alternatively, implementations can include verifying a particular user spoke a spoken utterance using output generated by both a text independent speaker recognition model as well as a text dependent speaker recognition model. Furthermore, implementations can additionally or alternatively include prefetching content for several users associated with a spoken utterance prior to determining which user spoke the spoken utterance.

20 Claims, 5 Drawing Sheets

Related U.S. Application Data

(60) Provisional application No. 62/774,743, filed on Dec. 3, 2018.

(51) Int. Cl.
  *G10L 15/07*  (2013.01)
  *G10L 15/32*  (2013.01)
  *G10L 17/24*  (2013.01)

(52) U.S. Cl.
  CPC ...... *G10L 17/24* (2013.01); *G10L 2015/0636* (2013.01); *G10L 2015/0638* (2013.01)

(56) References Cited

U.S. PATENT DOCUMENTS

| | | | |
|---|---|---|---|
| 9,767,806 B2* | 9/2017 | Giménez | G10L 17/22 |
| 9,990,926 B1* | 6/2018 | Pearce | G10L 15/05 |
| 10,325,602 B2 | 6/2019 | Sak et al. | |
| 10,762,906 B2* | 9/2020 | Ferreira Moreno | G10L 17/26 |
| 10,896,682 B1* | 1/2021 | Dusan | G10L 15/00 |
| 10,957,330 B2 | 3/2021 | Schwindt et al. | |
| 11,004,454 B1 | 5/2021 | Srinivasan et al. | |
| 2003/0171930 A1* | 9/2003 | Junqua | G07C 9/37 704/275 |
| 2010/0131273 A1 | 5/2010 | Aley-Ra et al. | |
| 2015/0255068 A1 | 9/2015 | Kim et al. | |
| 2016/0343375 A1 | 11/2016 | Williams et al. | |
| 2017/0069312 A1 | 3/2017 | Sundararajan et al. | |
| 2017/0301353 A1* | 10/2017 | Mozer | G10L 17/02 |
| 2018/0096690 A1 | 4/2018 | Mixter et al. | |
| 2018/0158463 A1 | 6/2018 | Ge et al. | |
| 2018/0201226 A1* | 7/2018 | Falkson | B60R 25/257 |
| 2018/0233142 A1 | 8/2018 | Koishida et al. | |
| 2018/0233152 A1 | 8/2018 | Olaya et al. | |
| 2018/0336903 A1 | 11/2018 | Durham et al. | |
| 2018/0366124 A1 | 12/2018 | Cilingir et al. | |
| 2018/0374486 A1* | 12/2018 | Zhao | G10L 17/22 |
| 2019/0027152 A1* | 1/2019 | Huang | G10L 21/0208 |
| 2019/0043508 A1* | 2/2019 | Sak | G10L 17/22 |
| 2019/0266996 A1* | 8/2019 | Lesso | G10L 17/06 |
| 2019/0341041 A1 | 11/2019 | Xie | |
| 2020/0342857 A1* | 10/2020 | Moreno | G10L 15/16 |
| 2021/0043191 A1 | 2/2021 | Chao et al. | |

FOREIGN PATENT DOCUMENTS

| | | | |
|---|---|---|---|
| CN | 103827963 | 5/2014 | |
| EP | 2897076 A1 * | 7/2015 | G06F 21/32 |
| GB | 201808118 | 5/2018 | |
| JP | 2004053821 | 2/2004 | |
| JP | 2005078072 | 3/2005 | |
| JP | 2017076117 | 4/2017 | |
| JP | 2017207602 | 11/2017 | |
| JP | 2018517927 | 7/2018 | |
| KR | 101247578 | 3/2013 | |
| KR | 101330328 | 11/2013 | |
| KR | 20160088446 | 7/2016 | |
| KR | 20180111310 | 10/2018 | |
| WO | 2018152007 | 8/2018 | |

OTHER PUBLICATIONS

Korean Intellectual Property Office; Allowance of Patent issued in Application Ser. No. KR10-2022-7016240; 3 pages; dated Jun. 11, 2022.

Novoselov, Sergey, et al. "On Deep Speaker Embeddings for Text-Independent Speaker Recognition", arXiv:1804.10080v1, dated Apr. 2018.

Li, Chao, et al. "Deep Speaker: an End-to-End Neural Speaker Embedding System", arXiv:1705.02304v1, dated Jul. 2017.

The Korean Intellectual Property Office; Notice of Allowance issued in Application No. 10-2020-7026622; 3 pages; dated Feb. 11, 2022.

European Patent Office; Extended European Search Report issued in Application No. 21180020.6, 15 pages, dated Jan. 26, 2022.

The Korean Intellectual Property Office; Notice of Office Action issued in Application No. 10-2020-7026622; 7 pages; dated Nov. 14, 2021.

Japanese Patent Office; Notice of Allowance issued in Application No. 2020-546167; 3 pages; dated Dec. 4, 2021.

European Patent Office; Communication issued in Application No. 21180020.6; 12 pages; dated Oct. 25, 2021.

Intellectual Property India; Examination Report issued in Application No. 202027036144; 7 pages; dated Sep. 16, 2021.

European Patent Office; International Search Report and Written Opinion of PCT Ser. No. PCT/US2019/063927; 17 pages; dated Jul. 2, 2020.

Wan, L. et al., "Generalized End-To-End Loss For Speaker Verification;" Cornell University, arXiv.org, arXiv:1710.10467v1; 5 pages; Oct. 28, 2017.

Heigold, G. et al., "End-To-End Text-Dependent Speaker Verification;" 2016 IEEE International Conference on Acoustic, Speech and Signal Processing (ICASSP); 5 pages; 2016.

Pinsky, Y., "Tomato, tomahto. Google Home now supports multiple users;" Blog; Google Assistant—Google Home; retrieved from the internet https://www.blog.google/products/assistant/tomato-tomahto-google-home-now-supports-multiple-users/; 3 pages; Apr. 20, 2017.

Chen, G. et al., "Small-Footprint Keyword Spotting Using Deep Neural Networks." 2014 IEEE International Conference on Acoustic, Speech and Signal Processing (ICASSP); 5 pages; 2014.

Variani, E. et al., "Deep Neural Networks For Small Footprint Text-Dependent Speaker Verification;" 2014 IEEE International Conference on Acoustic, Speech and Signal Processing (ICASSP); 5 pages; 2014.

European Patent Office; Intention to Grant issue in Application No. 19827988.7; 7 pages; dated Feb. 12, 2021.

European Patent Office; Invitation to Pay Additional Fees; Application No. PCT/US2019/063927; 13 pages; dated Mar. 13, 2020.

Intellectual Property India; Hearing Notice issued in Application No. 202027036144; 2 pages; dated Aug. 1, 2023.

European Patent Office; Communication issued in Application No. 23196353.9; 9 pages; dated Oct. 16, 2023.

China National Intellectual Property Adminstration; Notification of First Office Action issued for Application No. 201980020775.6, 16 pages, dated Oct. 10, 2023.

China National Intellectual Property Adminstration; Notice of Grant issued in Application No. 201980020775.6, 6 pages, dated May 1, 2024.

* cited by examiner

TEXT INDEPENDENT SPEAKER RECOGNITION

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed to text independent (TI) speaker recognition based on processing of audio data that captures a spoken utterance. However, it will of course be appreciated that, in addition to or instead of providing responsive content, other actions may be performed/cause to be performed, such as the controlling of other devices such as, but not limited to, smart locks, smart alarm systems, smart switches, and/or smart thermostats. In such examples, the other devices may only be caused to be controlled responsive to verifying that a particular authorized user spoke the particular spoken utterance. Speaker recognition can be used, with permission of a user, to verify that the user spoke a particular spoken utterance. Responsive to verifying that the user spoke the particular spoken utterance, content can be provided responsive to the particular spoken utterance, where that content is both responsive to the particular spoken utterance and is customized for the user. Speaker recognition can include processing, using a speaker recognition model, audio data that captures the spoken utterance to generate output, and comparing that output with a speaker embedding for the user (e.g., an embedding associated with a user profile of the user). For example, if a distance metric between the generated output and the speaker embedding for the user satisfies a threshold, the user can be verified as the user that spoke the particular spoken utterance. The speaker embedding for the user can be generated based on output(s) generated based on processing of one or more instances of audio data that includes spoken utterances that are from the user. For example, the speaker embedding can be based on an average (or other combination) of a plurality of different embeddings that are each generated based on processing of a corresponding instance of audio data that includes a corresponding spoken utterance from the user.

In text dependent (TD) speaker recognition, the speaker embedding of a user is generated based on spoken utterances that include only one or more specific words and/or one or more specific phrases. Moreover, in use, the user must speak the one or more specific words/phrases for output to be generated, using a TD speaker recognition model that sufficiently matches the speaker embedding. As one example, the one or more specific words/phrases in TD speaker recognition can be constrained to one or more invocation phrases configured to invoke an automated assistant. An invocation phrase for an automated assistant contains one or more hot words/trigger words such as, for example, "Hey Assistant", "OK Assistant", and/or "Assistant".

In contrast, in TI speaker recognition, the spoken utterance processed using a TI speaker recognition model is not constrained to specific word(s) and/or specific phrase(s). In other words, audio data based on virtually any spoken utterances can be processed using a TI speaker recognition model to generate output which can be effectively compared to a TI speaker embedding for a particular user to determine whether the spoken utterances are from the particular user. Moreover, in various implementations the speaker embedding of a user utilized in TI speaker recognition is generated based on spoken utterances that include disparate words and/or phrases.

In a variety of implementations, one or more speaker embeddings for a particular user are stored at a client device associated with the particular user (e.g., the client device is associated with a user profile for the particular user, and a locally stored speaker embedding is associated with the user profile). Further, multiple users can be associated with the same client device and thus multiple speaker embedding(s) for several particular users can be stored at the client device (e.g., the client device is associated with user profiles for several particular users, where each user profile includes at least one speaker embedding for the associated particular user). Storing speaker embeddings at a client device (as opposed to storing speaker embeddings at a remote computing device such as a server) can help preserve data security. TD speaker recognition can occur at a client device in various implementations. TI speaker recognition, on the other hand, can be computationally expensive (e.g., processor and/or memory resources) and/or rely on a TI speaker recognition model that requires a large amount of storage space. Accordingly, in many implementations TI speaker recognition can be better suited for remote computing device(s) (e.g., one or more servers) which can leverage their more robust resources. Additionally or alternatively, in many implementations TI speaker recognition can occur at a client device. For example, incremental verification results can be transmitted from the client device to a server when performing TI speaker recognition at the client device. Further, in various implementations a TI speaker embedding can be stored locally at a client device and transmitted to remote computing device(s) with audio data that captures a spoken utterance, to enable use of the TI speaker embedding for verification (by the remote computing device(s)) of the speaker of the utterance. In various implementations, speaker embedding(s) that are received with audio data at remote computing device(s), and utilized in TI speaker recognition, can be deleted from the remote computing device(s) immediately after they are used in the speaker recognition process, thus preserving data security and reducing opportunities for malicious actors to access the speaker embedding for the purpose of utilizing it in order to access content or control devices without being authorized to do so.

Some implementations disclosed herein are directed to at least selectively utilizing both a TD speaker recognition model and a TI speaker recognition model in speaker recognition. For example, an invocation portion, of audio data that captures a spoken utterance, can be processed using the TD speaker recognition model to generate TD output. The TD output can then be compared to a TD speaker embedding for a given user to generate a TD user measure for the given user. For instance, the TD user measure can be based on a distance (in embedding space) between the TD output and the TD speaker embedding. Further, at least an additional portion of the audio data, that captures the spoken utterance, can be processed using the TI speaker recognition model to generate TI output. The TI output can then be compared to a TI speaker embedding for the given user to generate a TI user measure for the given user. For instance, the TI user measure can be based on a distance (in embedding space) between the TI output and the TI speaker embedding.

Both the TD user measure and the TI user measure can at least selectively be utilized, in combination, in determining whether the given user is the speaker of the spoken utterance. For example, the TD user measure and the TI user measure can each be compared to a respective threshold, can be averaged (or otherwise combined) and compared to a threshold, and/or otherwise considered in combination in determining whether the given user is the speaker of the spoken utterance. Utilization of both the TD and TI user measures can increase the robustness and/or accuracy of speaker recognition. This can mitigate false positives that could compromise (e.g., data) security and/or mitigate false negatives that can result in a respective user needing to again provide a spoken utterance—and prevent computational and network resources from being wasted in again processing and transmitting the spoken utterance.

In some implementations, the TI speaker recognition model is utilized in speaker recognition only when the TD user measure fails to satisfy a threshold. For example, if the TD user measure for a given user indicates with high confidence that the given user is the speaker of spoken input, then TI speaker recognition can be bypassed. This can conserve computational resources by preventing the performance of TI speaker recognition when TD speaker recognition alone recognizes the speaker with high confidence. In some implementations, when both a TI user measure and a TD user measure are utilized in speaker recognition, respective weights for the two measures can be dynamically determined based on one or more features of the request for which the speaker is being recognized. Such features can include, for example, a length of a spoken utterance of the request (e.g., the overall length, or at least the length of any non-invocation portions of the request), and/or a magnitude of the TD user measure. For example, the TI user measure can be weighted more heavily for a request of "OK Assistant, what are my next five calendar entries" as compared to a request of "OK Assistant, what's up". Such heavier weighting can be based at least in part on "what are my next five calendar entries" being lengthier (duration wise and/or term/character wise) than "what's up"—since processing lengthier audio data using a TI speaker recognition model can lead to generation of a more accurate TI user measure. As another example, the TI user measure can be weighted less heavily when the TD user measure indicates a high degree of confidence, as compared to when the TD user measure does not indicate a high degree of confidence. Such dynamic weighting of TI and TD user measures can mitigate false positives and/or false negatives by shifting weighting in a manner that is more likely to lead to accurate speaker recognition.

Examples described above are described with respect to embeddings and measures associated with a single user. However, as described herein, in various situations a client device can be associated with multiple users, each having separate speaker embedding(s) (e.g., each having a respective TI speaker embedding and a respective TD speaker embedding). In those situations, a respective TD user measure and a respective TI user measure, for each of a plurality of the multiple users, can be utilized in recognizing which of the multiple users spoke a spoken utterance.

Some implementations disclosed herein are additionally or alternatively directed to initiating the determining of responsive content for each of multiple users associated with a request, where the initiating occurs prior to completion of determining (e.g., using a TI speaker recognition model) which of the multiple users spoke a spoken utterance captured in audio data of the request. The responsive content for a particular user can then be caused to be rendered responsive to the request, responsive to determining that the particular user spoke the spoken utterance captured in audio data of the request. Initiating the determining of responsive content for each of multiple users can enable the responsive content to start to be generated before it has been determined which of the multiple users spoke the spoken utterance. As a result, the responsive content for a particular user can be generated and/or rendered (or the action can be performed) with reduced latency, as compared to awaiting for recognition of the particular user before initiating the generation of responsive content for the particular user. Optionally, if a particular user is recognized prior to completion of generation of responsive content for other user(s), the generation of the responsive content for the other user(s) can be halted to prevent any further computational and/or network resources from being utilized in continuing to generate such responsive content for the other user(s).

Further, in various implementations, the initiating the determining of responsive content for each of multiple users associated with a request occurs only in response to initially determined TD measures for those multiple users satisfying one or more thresholds. For example, as described herein, TD measures can be generated before TI measures in various situations and/or can be included (or at least indicated) in a received request. If the TD measures for two of three users associated with a request satisfy a threshold, generating of responsive content for those two users can be preemptively initiated (while it's not initiated preemptively for the other user with a TD measure that fails to satisfy the threshold). If only the TD measure for one of the users satisfies the threshold, then optionally generating of responsive content can be preemptively initiated for only that one user. If the TD measures for all three users associated with a request satisfy a threshold, generating of responsive content for all three users can be preemptively initiated.

Some implementations are additionally or alternatively directed to automatically generating, using an updated TI speaker recognition model, an updated version of a TI speaker embedding for a given user. In some of those implementations, a request is received from a client device, where the request includes audio data that captures a spoken input of the given user, and includes a version of the speaker embedding for the given user. In some versions of those implementations, the updated version of the speaker embedding for the given user is generated responsive to determining that the version of the speaker embedding was generated using an outdated TI speaker recognition model. For example, the version of the speaker embedding can be determined to have been generated using the outdated TI speaker recognition model based on a version identifier, for the version of the speaker embedding, that is included in the request. The outdated version of the speaker embedding can nonetheless still be utilized in recognizing the given user as having spoken the spoken input included in the audio data of the request, and responsive content generated that is responsive to the spoken input and that is customized for the given user. The outdated version of the speaker embedding can be utilized in recognizing the given user, through leveraging of an outdated version of the TI speaker recognition model in processing at least a portion of the audio data to generate output, and comparing the generated output to the outdated version of the speaker embedding. The responsive content can be transmitted to the client device responsive to the request, thereby causing rendering of the responsive content (or a conversion thereof) at the client device. Leveraging of the outdated version of the TI speaker recognition model enables speaker recognition to be performed on requests that include outdated speaker embeddings, without having to await generation of an updated speaker embedding. This can enable continued support for outdated speaker embeddings despite deployment of updated speaker embedding models. Further, this can mitigate latency in generating a response to a request that includes an outdated speaker embedding, as the outdated speaker embedding can be utilized to recognize a speaker and to optionally transmit content that is customized for the recognized speaker—instead of needing to await the generation of an updated speaker embedding to verify the user (where the generation of the updated speaker embedding can introduce undesired latency). In addition, the technique ensures that a most up-to-date version of a TI speaker embedding for a given user is used the majority of the time while spreading the computational load associated with the generation and provision of updated speaker embeddings for all users. Moreover, since the version of a TI speaker embedding is only generated upon receipt of a request including content from a given user, updated versions of TI speaker embeddings are not automatically generated and provided for users who no longer utilize or only rarely utilize the assistant system.

The updated version of the speaker embedding can be generated based on past instances of audio data that are stored (with permission of the user), and that each capture past spoken utterances determined to be spoken by the user. In some of those various implementations, the past instances of audio data that are selected for generating the speaker embedding are selected based on one or more criteria that seek to increase the robustness of the embedding (thereby ensuring robust TI speaker recognition based on the speaker embedding). For example, a collection of instances of audio data can be selected based on including utterances that are collectively diverse (e.g., phonetically diverse, word diverse, and/or other diverse characteristic(s)), one or more instances of audio data can be selected based on including utterances that are of at least a threshold length, etc. Again, utilizing past instances of audio data that satisfy the one or more criteria can result in a more robust embedding. Further, utilizing the past instances can mitigate the need for the user to again provide a plurality of enrollment utterances, which can be time consuming and can unnecessarily consume resources, such as computational resources in processing the enrollment utterances and/or network resources in transmitting audio data corresponding to the enrollment utterances. Once generated, the updated speaker embedding can be transmitted to the client device to cause the client device to locally store the updated speaker embedding for transmission with future requests. When the updated speaker embedding is generated responsive to a request that is determined to include an outdated speaker embedding, the updated speaker embedding can optionally be transmitted subsequent to transmission of responsive content that is responsive to the request and that is generated utilizing the outdated TI speaker embedding. As mentioned above, leveraging of the outdated TI speaker recognition model can enable the responsive content (or action) to be generated provided quickly and with reduced latency, while the generation of the updated TI speaker embedding is still occurring.

The above description is provided as an overview of various implementations disclosed herein. Those various implementations, as well as additional implementations, are described in more detail herein.

In some implementations, a method implemented by one or more processors is provided that includes receiving, from a client device and via a network, an automated assistant request that includes: a text independent (TI) speaker embedding for a particular user of the client device, and audio data that captures spoken input of the particular user, where the audio data is captured via one or more microphones of the client device. The method further includes determining that the TI speaker embedding was generated using an outdated version of a TI speaker recognition model. The method further includes, in response to determining that the speaker embedding was generated using the outdated version of the TI speaker recognition model: processing at least a portion of the audio data using the outdated version of the TI speaker recognition model to generate TI output. The method further includes determining whether the particular user spoke the spoken input by comparing the TI output with the speaker embedding of the particular user. The method further includes, in response to determining the particular user spoke the spoken input: performing one or more actions that are based on the audio data, processing previous audio data, that captures previous spoken input of the particular user, using an updated version of the TI speaker recognition model to generate an updated speaker embedding, and transmitting, to the client device, the updated speaker embedding for the particular user to cause the client device to locally store the updated speaker embedding for transmission with future automated assistant requests.

These and other implementations of the technology disclosed herein can include one or more of the following features.

In some implementations, the one or more processors that implement the method are at one or more computing devices that are remote from the client device, and further including: in response to transmitting the updated speaker embedding for the particular user to the client device: deleting all instances of the updated speaker embedding from the one or more computing devices.

In some implementations, processing at least a portion of the audio data using the outdated version of the TI speaker recognition model to generate TI output includes: processing an additional portion of the audio data, that is in addition to an invocation phrase portion of the audio data, using the outdated version of the TI speaker recognition model to generate the TI output.

In some implementations, processing at least a portion of the audio data using the outdated version of the TI speaker recognition model to generate TI output includes: processing an invocation phrase portion of the audio data and an additional portion of the audio data using the outdated version of the TI speaker recognition model to generate the TI output.

In some implementations, processing the previous audio data that captures previous spoken input of the particular user using an updated version of the TI speaker recognition model to generate an updated speaker embedding includes: processing a plurality of instances of the previous audio data using the updated version of the TI speaker recognition model to generate the updated speaker embedding, where each of the instances of the previous audio data captures previous spoken input of the particular user.

In some implementations, the method further includes selecting the plurality of instances of the previous audio data based on the plurality of instances of the previous audio data satisfying one or more criteria.

In some implementations, the one or more criteria include one or multiple of: a length criterion for each of the plurality of instances of the previous audio data; and a diversity criterion for the plurality of instances of the previous audio data. In some versions of those implementations, the method further includes replacing an instance of previous audio data in the instances of the previous audio data with the audio data that captures the spoken input of the particular user by: determining a length of each instance of previous audio data in the plurality of previous audio data. The method further includes determining a length of the audio data that captures the spoken input of the particular user. The method further includes comparing the length of the audio data with the length of each instance of previous audio data. The method further includes, in response to determining, based on the comparing, that the audio data is longer than one or more instances of previous audio data, replacing the instance of previous audio data with the shortest length with the audio data.

In some implementations, determining that the TI speaker embedding was generated using an outdated version of the TI speaker recognition model is based at least in part on a version identifier for the TI speaker embedding, the version identifier included in the automated assistant request.

In some implementations, performing one or more actions that are based on the audio data includes controlling one or more peripheral devices based on the audio data.

In some implementations, performing one or more actions that are based on the audio data includes generating responsive content that is customized for the particular user and that is based on the audio data, and causing the client device to render output based on the responsive content. In some versions of those implementations, the method further includes generating the updated speaker embedding is completed subsequent to causing the client device to render output based on the responsive content.

In some implementations, the automated assistant request further includes a text dependent (TD) user measure generated locally at the client device using a TD speaker recognition model stored locally at the client device and using a TD speaker embedding stored locally at the client device, the TD speaker embedding being for the particular user, and where determining whether the particular user spoke the spoken input by comparing the TI output with the speaker embedding of the particular user further includes determining a TI user measure by comparing the TI output with the speaker embedding, and determining whether the particular user spoke the spoken input using both the TD user measure and the TI user measure. In some versions of those implementations, the method further includes determining whether the particular user spoke the spoke the spoken input using both the TD user measure and the TI user measure by determining a particular user probability measure which indicates the probability the particular user spoke the spoken input by combining the TD user measure and the TI user measure, and determining whether the particular user spoke the spoken input by determining whether the particular user probability measure satisfies a threshold. In some versions of those implementations, in response to determining that the speaker embedding was generated using the outdated version of the TI speaker recognition model, the method further includes determining that a first user profile and a second user profile are associated with the automated assistant request. The method further includes, responsive to determining that a first user profile and the second user profile are associated with the automated assistant request initiating generating of first responsive content that is customized for the first user and that is in response to the spoken input. The method further includes initiating generating of second responsive content that is customized for the second user and that is in response to the spoken input. The method further includes, prior to completion of generating the first responsive content and the second responsive content, processing at least the portion of audio data using the TI speaker recognition model to generate TI output. The method further includes determining whether the particular user is the first user, and whether the particular user spoke the spoken input by comparing the TI output with a speaker embedding of the first user. The method further includes, in response to determining that the particular user spoke the spoken input further comprises transmitting, to the client device, the first responsive content without transmitting the second responsive content to the client device.

In some implementations, a method implemented by one or more processors is provided that includes receiving, from a client device and via a network, an automated assistant request that includes: audio data that captures spoken input of a user, wherein the audio data is captured at one or more microphones of the client device, and a text dependent (TD) user measure generated locally at the client device using a TD speaker recognition model stored locally at the client device and using a TD speaker embedding stored locally at the client device, the TD speaker embedding being for a particular user. The method further includes processing at least a portion of the audio data using a text independent (TI) speaker recognition model to generate TI output. The method further includes determining a TI user measure by comparing the TI output with a TI speaker embedding that is associated with the automated assistant request, and that is for the particular user. The method further includes determining whether the particular user spoke the spoken input using both the TD user measure and the TI user measure. The method further includes, in response to determining the spoken input is spoken by the particular user: generating responsive content that is responsive to the spoken input and that is customized for the particular user. The method further includes transmitting the responsive content to the client device to cause the client device to render output based on the responsive content.

These and other implementations of the technology disclosed herein can include one or more of the following features.

In some implementations, the automated assistant request received from the client device via the network further includes the TI speaker embedding for the particular user.

In some implementations, determining whether the particular user spoke the spoken input using both the TD user measure and the TI user measure includes determining a particular user probability measure which indicates the probability the particular user spoke the spoken input by combining the TD user measure and the TI user measure. The method further includes determining whether the particular user spoke the spoken input by determining whether the particular user probability measure satisfies a threshold. In some versions of those implementations, combining the TD user measure and the TI user measure includes utilizing a first weight for the TD user measure in the combining and utilizing a second weight for the TI user measure in the combining. In some versions of those implementations, the method further includes determining the first weight and the second weight based on a length of the audio data or the spoken input.

In some implementations, the method further includes determining the first weight and the second weight based on a magnitude of the TD user measure.

In some implementations, the method further includes determining the TD user measure fails to satisfy a threshold, where processing the portion of the audio data to generate TI output, determining the TI user measure, and determining whether the particular user spoke the spoken input using both the TD user measure and the TI user measure, are only performed in response to determining the TD user measure fails to satisfy the threshold.

In some implementations, a method implemented by one or more processors is provided that includes receiving, from a client device and via a network, an automated assistant request that includes audio data that captures spoken input, wherein the audio data is captured at one or more microphones of the client device. The method further includes determining that a first user profile and a second user profile are associated with the automated assistant request. The method further includes, responsive to determining that the first user profile and the second user profile are associated with the automated assistant request, initiating generating of first responsive content that is customized for the first user and that is responsive to the spoken input. The method further includes initiating generating of second responsive content that is customized for a second user and that is responsive to the spoken input. The method further includes, prior to completion of generating the first responsive content and the second responsive content, processing at least a portion of the audio data using a text independent (TI) speaker recognition model to generate TI output. The method further includes determining that the first user spoke the spoken input by comparing a first user speaker embedding corresponding to the first user profile and the TI output. The method further includes, in response to determining the first user spoke the spoken input, transmitting, to the client device, the first responsive content without transmitting the second responsive content to the client device.

These and other implementations of the technology disclosed herein can include one or more of the following features.

In some implementations, determining that the first user spoke the spoken input occurs prior to completion of generating of the second responsive content customized for the second user, and further including, in response to determining the first user spoke the spoken input, halting generating of the second responsive content customized for the second user.

In some implementations, the method further includes determining that a third user profile is associated with the automated assistant request in addition to the first user profile and the second user profile. The method further includes, responsive to determining that the third user profile is associated with the automated assistant request, initiating generating of third responsive content that is customized for the third user and that is responsive to the spoken input.

In some implementations, determining that the first user spoke the spoken input is further based on a text dependent (TD) user measure, for the first user profile, that is included in the automated assistant request.

In some implementations, the automated assistant request further includes a first text dependent (TD) measure for the first user profile and a second TD measure for the second user profile, and where initiating generating of the first responsive content and where initiating generating of the second responsive content is further responsive to the first TD measure and the second TD measure failing to satisfy one or more thresholds.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
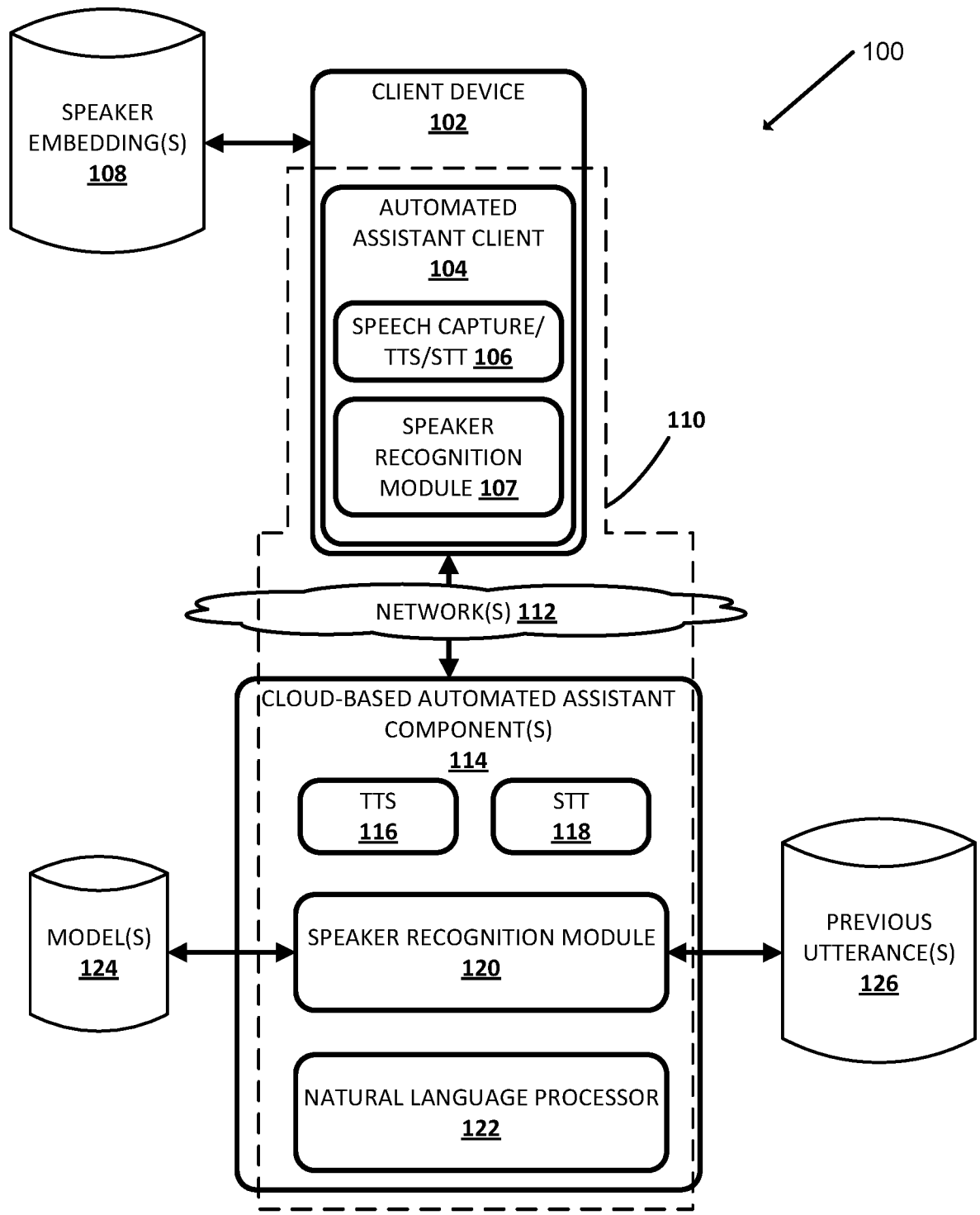
FIG. 1 is a block diagram illustrating an example environment in which various implementations can be implemented.

Speaker recognition can be used, with permission of a user, to verify that the user spoke a particular spoken utterance. Responsive to verifying that the user spoke the particular spoken utterance, content can be provided responsive to the particular spoken utterance, where that content is both responsive to the particular spoken utterance and is customized for the user. Speaker recognition can include processing, using a speaker recognition model, audio data that captures the spoken utterance to generate output, and comparing that output with a speaker embedding for the user (e.g., an embedding associated with a user profile of the user). For example, if a distance metric between the generated output and the speaker embedding for the user satisfies a threshold, the user can be verified as the user that spoke the particular spoken utterance. The speaker embedding for the user can be generated based on output(s) generated based on processing of one or more instances of audio data that includes spoken utterances that are from the user. For example, the speaker embedding can be based on an average (or other combination) of a plurality of different embeddings that are each generated based on processing of a corresponding instance of audio data that includes a corresponding spoken utterance from the user.

In TD speaker recognition, the speaker embedding of a user is generated based on spoken utterances that include only one or more specific words and/or one or more specific phrases. Moreover, in use, the user must speak the one or more specific words/phrases for output to be generated, using a TD speaker recognition model that sufficiently matches the speaker embedding. As one example, the one or more specific words/phrases in TD speaker recognition can be constrained to one or more invocation phrases configured to invoke an automated assistant. An invocation phrase for an automated assistant contains one or more hot words/trigger words such as, for example, "Hey Assistant", "OK Assistant", and/or "Assistant".

In contrast, in TI speaker recognition, the spoken utterance processed using a TI speaker recognition model is not constrained to specific word(s) and/or specific phrase(s). In other words, audio data based on virtually any spoken utterances can be processed using a TI speaker recognition model to generate output which can be effectively compared to a TI speaker embedding for a particular user to determine whether the spoken utterances are from the particular user. Moreover, in various implementations the speaker embedding of a user utilized in TI speaker recognition is generated based on spoken utterances that include disparate words and/or phrases.

As described herein, in some implementations, a spoken utterance can include an invocation phrase as well as a subsequent portion following the invocation phrase, where an automated assistant can generate responsive content based on the subsequent portion of the spoken utterance. For example, "Hey Assistant, what is my name" includes the invocation phrase of "Hey Assistant" and an additional portion of "what is my name". In many implementations, an automated assistant can generate responsive content that is responsive to the additional portion, and that is customized for a particular user based on verifying that the particular user spoke the spoken utterance. For example, a response of "Susan" can be generated responsive to "Hey Assistant, what is my name" based on determining that "what is my name" requests a stored name of the requesting user, and based on verifying that the spoken utterance is from a user having a stored name of "Susan". In some implementations, both the invocation phrase portion and the additional portion of the spoken utterance can be processed by a TI speaker recognition model in determining whether output generated using the TI speaker recognition model matches a speaker embedding for a given user. In some other implementations, only the additional portion of the audio data (or a smaller portion of the additional portion) can be processed using the TI speaker recognition model. Further, in various situations the spoken utterance lacks any invocation phrase, and thus the portion(s) of the audio data that are processed using the TI speaker recognition model do not include any portion(s) that include an invocation phrase.

In a variety of implementations, one or more speaker embeddings for a particular user are stored at a client device associated with the particular user (e.g., the client device is associated with a user profile for the particular user, and a locally stored speaker embedding is associated with the user profile). Further, multiple users can be associated with the same client device and thus multiple speaker embedding(s) for several particular users can be stored at the client device (e.g., the client device is associated with user profiles for several particular users, where each user profile includes at least one speaker embedding for the associated particular user). Storing speaker embeddings at a client device (as opposed to storing speaker embeddings at a remote computing device such as a server) can help preserve data security. TD speaker recognition can occur at a client device in various implementations. TI speaker recognition, on the other hand, can be computationally expensive (e.g., processor and/or memory resources) and/or rely on a TI speaker recognition model that requires a large amount of storage space. Accordingly, in many instances TI speaker recognition can be better suited for remote computing device(s) (e.g., one or more servers) which can leverage their more robust resources. Further, in various implementations a TI speaker embedding can be stored locally at a client device and transmitted to remote computing device(s) with audio data that captures a spoken utterance, to enable use of the TI speaker embedding for verification (by the remote computing device(s)) of the speaker of the utterance. In various implementations, speaker embedding(s) that are received with audio data at remote computing device(s), and utilized in TI speaker recognition, can be deleted from the remote computing device(s) immediately after they are used in the speaker recognition process, thus preserving the data security.

In many implementations, a remote computing device can receive an automated assistant request from a client device. An automated assistant request can include a variety of information including: audio data capturing a spoken utterance (e.g., the audio data can be streamed in the request), one or more TI speaker embeddings, one or more TD speaker embeddings, one or more measures determined using one or more speaker embeddings (e.g., a TD speaker measure determined locally at a client device that transmitted the request), an indication of version(s) of TI speaker recognition model used to generate the TI speaker embedding(s), an indication of version(s) of TD speaker recognition model used to generate the TD speaker embedding(s), and/or additional information used by an automated assistant in speaker recognition, automatic speech recognition (ASR), natural language understanding (NLU), and/or other processes.

A speaker embedding can be generated using one or more stored previous utterances of a particular user, thus enrolling the particular user in a speaker recognition system using the stored previous utterance(s). A particular user can be automatically enrolled (and/or enrolled with the user's express permission) in a speaker recognition system in accordance with many implementations. For example, an automated assistant can generate an updated speaker embedding in response to determining a received speaker embedding was generated using an outdated version of a TI speaker recognition model. In many implementations, the system can verify a user (and generate responsive content that is customized for the user) using an outdated version of a speaker recognition model while the system is generating an updated version of the speaker embedding. In various implementations, the updated speaker embedding is generated based on past instances of audio data that are stored (with permission of the user), and that each capture past spoken utterances determined to be spoken by the user. In some of those various implementations, the past instances of audio data that are selected for generating the speaker embedding are selected based on one or more criteria that seek to increase the robustness of the embedding. For example, a collection of instances of audio data can be selected based on including utterances that are collectively diverse (e.g., phonetically diverse, word diverse, and/or other diverse characteristic(s)), one or more instances of audio data can be selected based on including utterances that are of at least a threshold length, etc.

In a variety of implementations, a speaker recognition system can verify if a spoken utterance was by a particular user by combining a TI user metric (generated using a TI speaker recognition model) with a TD user metric (generated using a TD speaker recognition model). For example, an automated assistant request can include audio data based on a spoken utterance, a TI speaker embedding for a particular user, and a TD user measure determined by processing an invocation phrase portion of the spoken utterance using a TD speaker recognition model to generate output and comparing that output to a TD speaker embedding. Additionally or alternatively, an automated assistant request can include the TD speaker embedding itself, and the TD user measure can be determined at a remote computing device. In a variety of implementations, the audio data can be processed using a TI speaker recognition model to generate additional output which can be compared with a TI speaker embedding to generate a TI user measure. The TD user measure and the TI user measure can be combined to verify if the particular user spoke the spoken utterance. In various implementations, the respective weightings of the TD and TI user measures can be dynamically determined for a given automated assistant request, based on one or more features of the given automated assistant request.

Additionally or alternatively, a speaker recognition system in accordance with a variety of implementations can initiate the generation of responsive content customized for several users associated with a client device while a TI speaker recognition model is used to determine which user spoke a spoken utterance. For example, three users can be associated with a client device. An automated assistant request can include a speaker embedding for each of the three users in addition to audio data capturing a spoken utterance by one of the three users. A system can initiate generating responsive content customized for each of the three users prior to determining which user spoke the utterance. Once the system determines which user spoke the utterance by processing each of the three speaker embeddings using a TI speaker recognition model, the system can transmit responsive content customized for the user who spoke the utterance to the client device without transmitting the responsive content customized for the other two users.

In many implementations, automatically generating an updated speaker embedding for a particular user using stored prior utterances of that user (i.e., automatically enrolling a user in an updated version of a TI speaker recognition system) can prevent a prolonged enrollment process in which a user must speak one or more enrollment utterances before responsive content can be generated for the user. Such enrollment processes require the transmission of audio data corresponding to those utterances, which consumes network resources, and can require various prompts to be provided to the user, which additionally consumes network resources as well as client device resources. Additionally or alternatively, automatic enrollment of a user in accordance with implementations described herein can enable immediate verification of a user based on an outdated version of a TI speaker recognition model, thereby enabling responsive content to be provided more quickly, without first requiring the user to reenroll using the updated version of the TI speaker recognition model and/or without first waiting for the generation of an updated speaker embedding using stored utterances. In other words, latency in providing responsive content to the user can be minimized for automated assistant requests that include an outdated version of a speaker embedding.

Additionally or alternatively, verifying the identity of a speaker using both a user measure generated using a TI speaker recognition model as well as a user measure generated using a TD speaker recognition model can ensure content is customized for the user that spoke the spoken input thereby mitigating erroneously providing content for another user, which could cause the compromise of data security and/or mitigate erroneously causing the unauthorized performance of actions, such as the controlling of a smart lock or smart home alarm system. Additionally or alternatively, erroneously providing content for another user can waste system resources as a result of the user that spoke the spoken utterance needing to again speak the input to attempt to get the content customized for him/her. In many implementations, if the TD user measure indicates a threshold level of confidence, audio data is not processed using the TI speaker recognition model, thereby preventing unnecessary usage of resources for determining a TI user measure in some situations.

In many implementations, prefetching responsive content customized for several users reduces the latency of generating and/or transmitting responsive content based on an automated assistant request by initiating generating of content for N users before a particular user, of the N users, has been identified as a source of the spoken utterance of the automated assistant request.

Turning now to the Figures, FIG. 1 illustrates an example environment 100 in which various implementations can be implemented. The example environment 100 includes one or more client device 102. Each client device may execute a respective instance of an automated assistant client 104. One or more cloud-based automated assistant components 114, such as speaker recognition module 120 and/or natural language processor 122 may be implemented on one or more computing systems (collectively referred to as cloud computing systems) that are communicatively coupled to client device 102 via one or more local and/or wide area networks (e.g. the Internet) indicated generally as 112.

In various implementations, the instance of an automated assistant client 104, by way of its interactions with one or more cloud-based automated assistant components 114, may form what appears to be from the user's perspective, a logical instance of an automated assistant 110 with which the user may engage in a dialog. One such instance of an automated assistant 110 is depicted in FIG. 1 by a dashed line. It thus should be understood that each user that engages with an automated assistant client 104 executing on client device 102, may, in effect, engage with their own logical instance of automated assistant 110. For the sake of brevity and simplicity, the term "automated assistant" as used herein as "serving" a particular user may often refer to the combination of an automated assistant client 104 operated by the user and one or more cloud-based automated assistant components 114 (which may be shared amongst multiple automated assistant clients 104). It should also be understood that in some implementations, automated assistant 110 may respond to a request from any user regardless of whether the user is actually "served" by that particular instance of automated assistant 110. Additionally or alternatively, one or more users may be associated with the client device. For example, five users living in the same household may all share a client device (such as a standalone interactive speaker), and user features such as speaker embeddings associated with each of the three users may be stored on the client device.

Client device 102 may include, for example, one or more of: a desktop computing device, a laptop computing device, a tablet computing device, a touch sensitive computing device (e.g., a computing device which can receive input via touch from the user), a mobile phone computing device, a computing device in a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, client device 102 may include one or more sensors (not picture) that may come in various forms. Sensors can sense varying types of input to the automated assistant 110 such as verbal, textual, graphical, physical (e.g., a touch on a display device including a touch sensitive projector and/or a touch sensitive screen of a computing device), and/or visual (e.g., a gesture) based input. Some client devices 102 may be equipped with one or more digital cameras that are configured to capture and provide signal(s) indicative of movement detected in the fields of view. Additionally or alternatively, some client devices may be equipped with sensors that detect acoustic (or pressure) waves, such as one or more microphones.

Client device 102 and/or cloud-based automated assistant components 114 can be in communication with one or more devices (not pictures). Devices can include any of a variety of devices including: Internet of Things devices such as smart appliances, smart thermostats, smart coffee makers, smart locks, etc. The devices are linked with the client device 102 (and/or a particular user of the client device 102) and with one another. For example, the devices can be linked to a profile assigned to the client device 102 (and optionally other client devices) and/or can be linked to a profile assigned to a user of the client device 102. Collectively, the client device 102, other client device(s), and the devices can define a coordinated ecosystem of devices. In various implementations, devices are linked to one another via a device topology representation that can be user created and/or automatically created, and that may define various assistant client devices, various smart devices, identifier(s) for each, and/or other attribute(s) for each. For example, the identifier(s) for a device can specify a room (and/or other area(s)) of a structure in which the device is located (e.g., living room, kitchen) and/or can specify nickname(s) and/or alias(es) for the device (e.g., couch lamp, front door lock, bedroom speaker, kitchen assistant, etc.). In this manner, the identities of devices can be names, aliases, and/or locations of the respective devices that the user is likely to associate with the respective devices.

In many implementations, automated assistant 110 may engage in dialog sessions with one or more users via user interface input and output devices of the one or more client devices 102. In some implementations, automated assistant 110 may engage in dialog sessions with a user in response to user interface input provided by the user via one or more interface input devices of one of the client devices 102. In some of those implementations, the user interface input is explicitly directed to the automated assistant 110. For example, a user may speak a predetermined invocation phrase, such as "OK, Assistant" or "Hey, Assistant", to cause automated assistant 110 to begin actively listening.

In some implementations, automated assistant 110 may engage in a dialog session in response to user interface input, even when that user interface input is not explicitly directed to automated assistant 110. For example, automated assistant 110 may examine the contents of user interface input and engage in a dialog session in response to certain terms being present in the user interface input and/or based on other cues. In many implementations, automated assistant 110 may utilize speech recognition to convert utterances from users into text, and respond to the text accordingly, e.g., by providing visual information, by providing search results, by providing general information, and/or taking one or more response actions (e.g., playing media, launching a game, ordering food, etc.). In some implementations, the automated assistant 110 can additionally or alternatively respond to utterances without converting the utterances into text. For example, the automated assistant 110 can convert the voice input into an embedding, into entity representation(s) (that indicate entity/entities present in the voice input) and/or other "non-textual" representations and operate on such non-textual representations. Accordingly, implementations described herein as operating based on text converted from voice input may additionally and/or alternatively operate on the voice input directly and/or other non-textual representations of the voice input.

Each of the client computing devices 102 and computing device(s) operating cloud-based automated assistant components 114 may include one or more memories for storage of data and software applications, one or more processors for accessing data and executing applications, and other components that facilitate communication over a network. The operations performed by one or more computing devices 102 and/or automated assistant 110 may be distributed across multiple computer systems. Automated assistant 110 may be implemented as, for example, computer programs running on one or more computers running in one or more locations that are coupled to each other through a network.

As noted above, in various implementations, client computing device 102 may operate an automated assistant client 104. In various implementations, each automated assistant client 102 may include a speech capture/text-to-speech (TTS)/speech-to-text (STT) engine 106, a speaker recognition module 107, as well as additional engines and/or modules (not pictured). In other implementations, one or more aspects of speech capture/TTS/STT engine 106 and/or speaker recognition module 107 may be implemented separately from the automated assistant client 104.

Each speech capture/TTS/STT engine may be configured to perform one or more functions: capture a user's speech, e.g., via a microphone; convert that captured audio to text (and/or other representations or embeddings); and/or convert text to speech. For example, in some implementations, because a client device 102 may be relatively constrained in terms of computing resources (e.g., processor cycles, memory, battery, etc.), the speech capture/TTS/STT engine that is local to each client device 102 may be configured to convert a finite number of different spoken phrases—particularly phrases that invoke automated assistant 110—to text (or other forms). Other speech input may be sent to cloud-based automated assistant components 114, which may include cloud-based TTS 116 engine and/or cloud-based STT engine 118.

Cloud-based STT engine 118 may be configured to leverage the virtually limitless resources of the cloud to convert audio data captured by speech capture/TTS/STT engine 106 into text (which may then be provided to natural language processor 122). Cloud-based TTS engine 116 may be configured to leverage the virtually limitless resources of the cloud to convert textual data (e.g., natural language responses formulated by automated assistant 110) into computer-generated speech output to client device 102 to be output directly, e.g., using one or more speakers. In other implementations, textual data (e.g., natural language responses) generated by automated assistant 110 may be provided to speech capture/TTS/STT engine 106, which may then convert the textual data into computer-generated speech that is output locally.

Automated assistant 110 (e.g., cloud-based automated assistant components 114) may include a natural language processor, a TTS engine 116, a STT engine 118, a speaker recognition module 120 and other components, some of which are described in more detail below. In some implementations, one or more engines and/or modules of automated assistant 110 may be omitted, combined, and/or implemented in a component that is separate from automated assistant 110. In some implementations, to preserve data security, one or more of the components of automated assistant 110, such as natural language processor 122, TTS engine 116, STT engine 118, speaker recognition module 120, etc., may be implemented at least in part on client device 102 (e.g., to the exclusion of the cloud).

In some implementations, automated assistant 110 generates responsive content in response to various inputs generated by a user of client device 102 during a human-to-computer dialog session with automated assistant 110. Automated assistant 110 may provide the responsive content (e.g., over one or more networks when separate from a client device of a user) for presentation to the user as part of the dialog session. For example, automated assistant 110 may generate responsive content in response to free-form natural language input provided via client device 102. As used herein, free-form input that is formulated by the user that is not constrained to a group of options presented for selection by the user.

Natural language processor 122 of automated assistant 110 processes natural language input generated by users via client device 102 and may generate annotated output for use by one or more components of automated assistant 110. For example, the natural language processor 122 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. Also, for example, in some implementations the natural language processor 122 may additionally and/or alternatively include a dependency parser (not picture) configured to determine syntactic relationships between terms in natural language input.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not pictured) configured to group, or "cluster" references to the same entity based on one or more contextual cues. For example, the coreference resolver may be utilized to resolve the term "there" to "Hypothetical Café" in the natural language input "I liked Hypothetical Café last time we ate there".

In many implementations, one or more components of the natural language processor 122 may rely on annotations from one or more components of the natural language processor 122. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 122 may use related prior input and/or other related data outside of the particular natural language input to determine one or more annotations.

In many implementations, automated assistant 110 can include speaker recognition module 107 of automated assistant client 104, cloud-based speaker recognition module 120, speaker embedding(s) 108, speaker recognition model(s) 124 (such as TI speaker recognition model(s) and/or TD speaker recognition model(s)), and audio data capturing previous utterances of one or more users 126. Speaker recognition module 107 of automated assistant client 104 can determine an automated assistant request to transmit to one or more cloud-based components such as cloud-based speaker recognition module 120. In many implementations, automated assistant requests can include one or more speaker embeddings 108 (e.g., TI speaker embeddings, TD speaker embeddings, speaker embeddings for multiple users associated with client device 102, etc.), audio data capturing spoken input (e.g., audio data captured by speech capture/TTS/STT module 106), one or more TD speaker recognition models, one or more TI speaker recognition models, one or more measures determined by processing audio data capturing spoken input using a speaker recognition model locally stored at the client device (e.g., a measure indicating the probability a particular user spoke a spoken utterance, etc.), as well as one or more user profiles containing information about one or more users associated with the client device.

In many implementations, cloud-based speaker recognition module 120 can be utilized in automatically generating (and/or generating with explicit user permission) an updated speaker embedding based on audio data capturing prior utterances 126 of the user. In many implementations, cloud-based speaker recognition model 120 can verify if a particular user spoke a spoken utterance using both a user score generated by a TI speaker recognition model as well as a user score generated by a TD speaker recognition model. Additionally or alternatively, cloud-based speaker recognition model 120 can be used in prefetching content for several users associated with a client device while the identity of a user who spoke an utterance is determined using a TI speaker recognition model.

Figure 2:
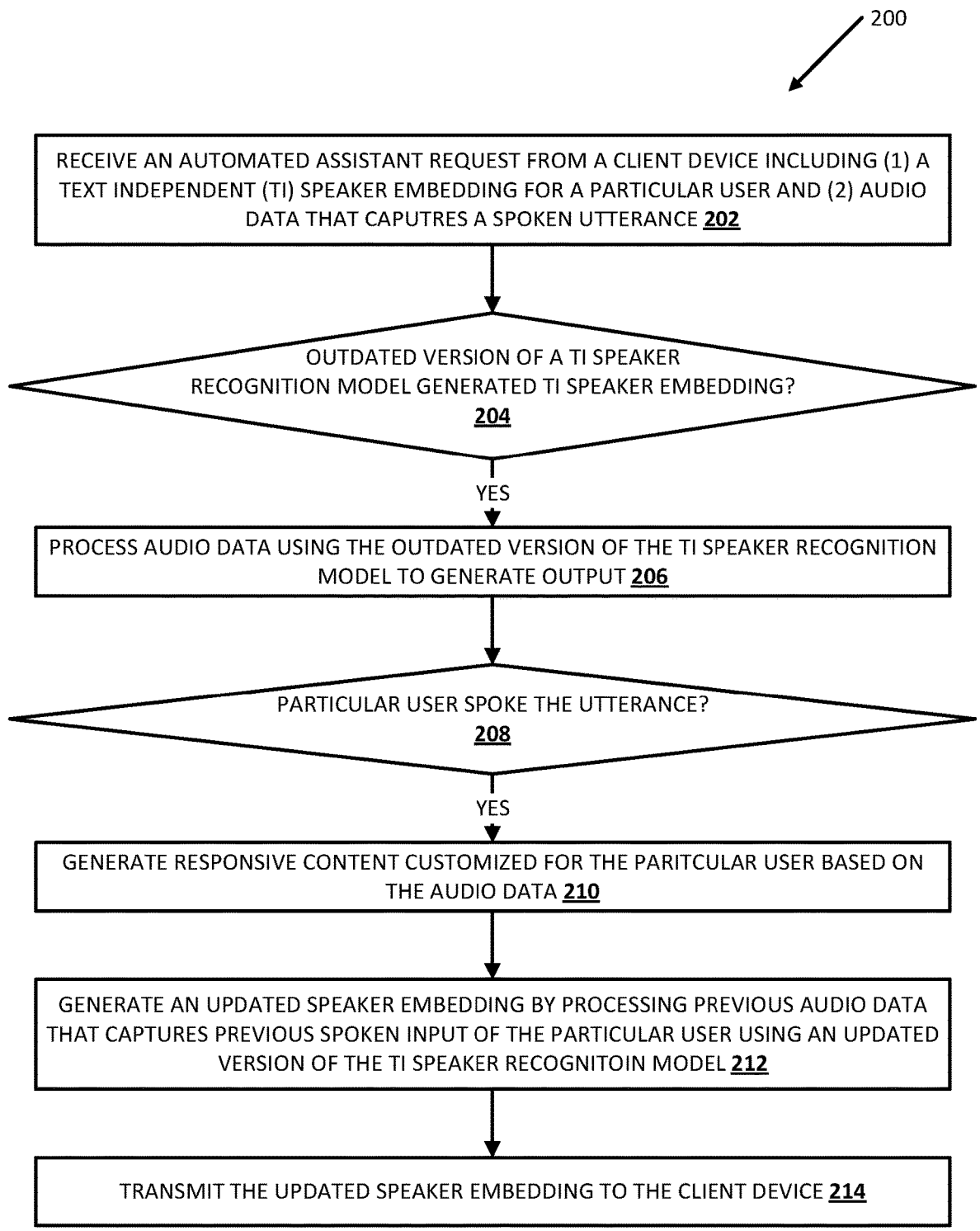
FIG. 2 is a flowchart illustrating an example process according to implementations disclosed herein.

Turning now to FIG. 2, a flowchart is provided that illustrates a process 200 of generating an updated speaker embedding using an updated version of a TI speaker recognition model according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 200 are shown in a particular order, this is not meant to be limiting. One or more operations may be reordered, omitted, and/or added.

At block 202, the system receives an automated assistant request from a client device. In many implementations, the automated assistant request includes a TI speaker embedding for a particular user and audio data that captures a spoken utterance. In several implementations, the spoken utterance is captured by one or more microphones of the client device.

At block 204, the system determines whether an outdated version of a TI speaker recognition model generated the TI speaker embedding received as part of the automated assistant request. If so, the system proceeds to block 206, and processes the audio data using the outdated version of the TI speaker recognition model to generate output. If the system determines a current version of the TI speaker recognition model generated the speaker embedding, the process can verify the particular speaker spoke the utterance using the current version of the TI speaker recognition model and the process can end.

At block 208, the system determines whether the particular user spoke the spoken utterance. If so, the system proceeds to block 210. In determining whether the particular user spoke the spoken utterance, the system can processing the audio data using the outdated TI speaker recognition model to generate output. The system can compare the generated output with the TI speaker embedding for the particular user to determine whether the particular user spoke the spoken utterance. In many implementations, the system can process the entire spoken utterance. In several implementations, the system can process only a portion of the spoken utterance. For example the system can process only a subsequent portion following an invocation phrase portion of the spoken utterance to generate output to compare with the speaker embedding. However, if the system determines the particular user did not speak the spoken utterance, in some implementations, the system can determine the spoken utterance was provided by a guest user, and the system can generate responsive content not customized for any specific user.

At block 210, the system generates responsive content customized for the particular user based on the audio data. In many implementations, the system causes the client device to render output based on the responsive content. For example, the system can render content including details of one or more calendar events for the day for a particular user in response to the spoken utterance of "Assistant, what is on my calendar today".

At block 212, the system generates an updated speaker embedding by processing previous audio data that captures previous spoken input of the particular user using an updated version of the TI speaker recognition model. In several implementations, one or more instances of previous audio data for a particular user can be stored at the remote computing device (e.g., stored in a database associated with a server). In several implementations, one or more instances of previous audio data for a particular user can be stored at the client device and transmitted as part of the automated assistant request.

In a variety of implementations, instances of previous audio data can be selected based on one or more criteria, such as length, diversity, and/or other criterion/criteria. For example, the instances of previous audio data can be selected based on each of the instances being of at least a threshold length (e.g., based on number of words and/or length of time a user spoke the spoken utterance). Also, for example, the instances of previous audio data can additionally or alternatively be selected by analyzing words, phonemes, etc. in the previous utterances to increase the diversity between instances of previous audio data. In other words, instances of previous audio data can be selected to decrease the number of overlapping words and/or sounds between instances of previous audio data.

At block 214, the system transmits the updated speaker embedding to the client device. In many implementations, the client device can locally store the updated speaker embedding for transmission with future automated assistant requests. In many implementations, the updated version of the speaker embedding can be deleted at the remote computing device after it has been transmitted to the client device to help data security.

Figure 3:
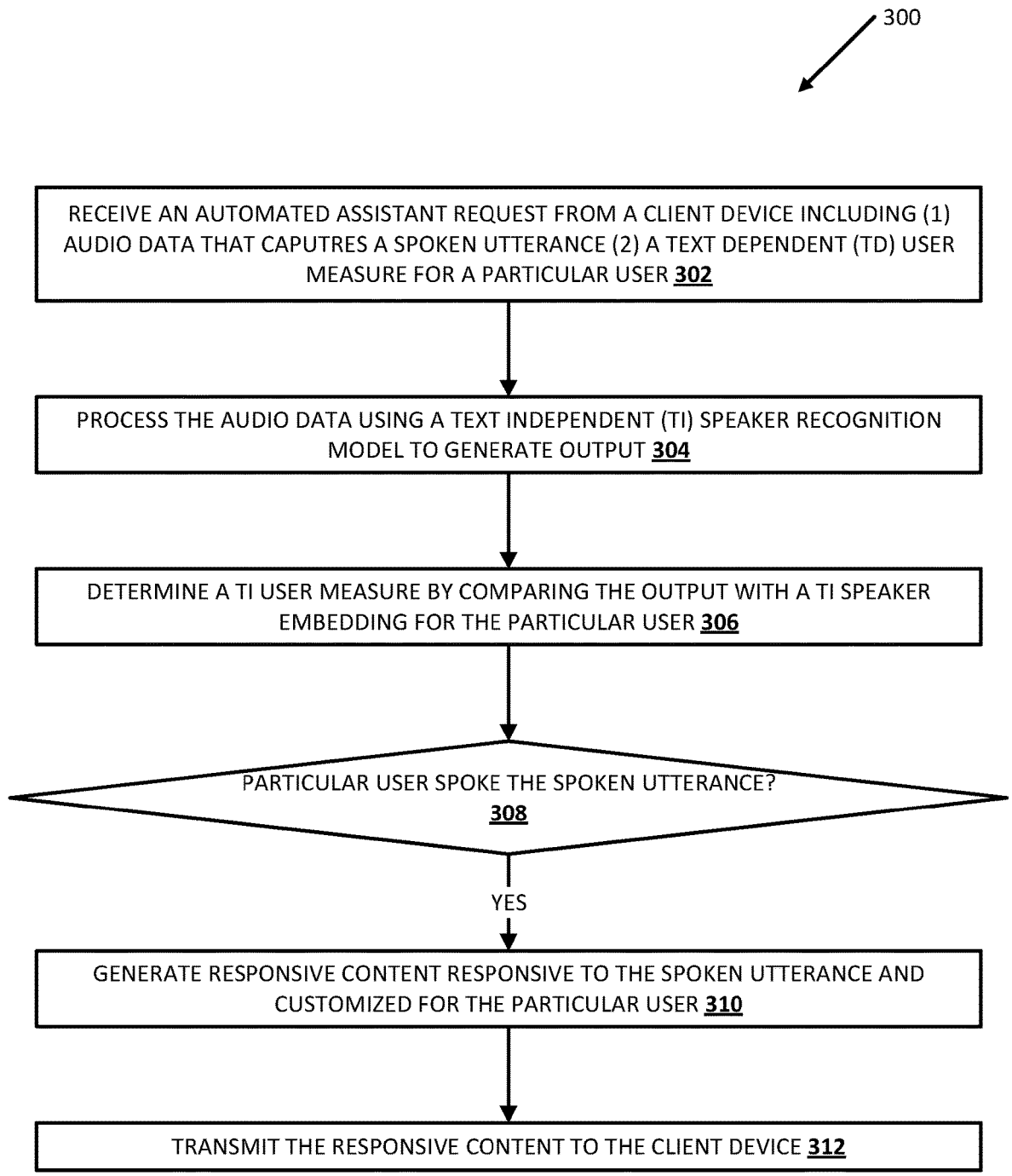
FIG. 3 is another flowchart illustrating another example process according to implementations disclosed herein.

Turning now to FIG. 3, a flowchart is provided that illustrates a process 300 of determining whether a particular user spoke an utterance based on output generated by a TI speaker recognition model and output generated by a TD speaker recognition model according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 300 are shown in a particular order, this is not meant to be limiting. One or more operations may be reordered, omitted, and/or added.

At block 302, the system receives an automated assistant request from a client device. In many implementations, the automated assistant request includes audio data that captures a spoken utterance and a TD user measure for a particular user. In many implementations, the spoken utterance can be captured by one or more microphones of the client device. In many implementations, a TD user measure can be generated, locally at the client device, by processing an invocation phrase portion of the spoken utterance using a TD speaker recognition model to generate output and comparing the output with a TD speaker embedding.

At block 304, the system processes the audio data using a TI speaker recognition model to generate output. In many implementations, the system can process the entire spoken utterance. In several implementations, the system can process only a portion of the spoken utterance. For example the system can process only a subsequent portion following an invocation phrase portion of the spoken utterance to generate output to compare with the speaker embedding.

At block 306, the system determines a TI user measure by comparing the output generated using the TI speaker recognition model with a TI speaker embedding for the particular user.

At block 308, the system determines whether the particular user spoke the spoken utterance. If so, the system proceeds to block 310. In many implementations, the system can determine whether the particular user spoke the spoken utterance using the TI user measure and the TD user measure. For example, the TI user measure and the TD user measure values can be concatenated, and if the concatenation is above a threshold value, the particular user spoke the spoken utterance. Additionally or alternatively, the TD user measure and/or the TI user measure can be weighted. For example, if the TD user measure and/or the TI user measure indicates a very high probability the user spoke the spoken utterance, the user measure can be weighted more heavily (e.g., if the TI user measure indicates a 95% certainty the user spoke the spoken utterance, the TI user measure can be weighted more heavily than the TD user measure). Conversely, a TI user measure and/or a TD user measure which indicates a low probability the user spoke the spoken utterance can be weighted more heavily (e.g., a TI user measure which indicates a 10% probability the user spoke the spoken utterance can be weighted more heavily than the TD user measure). In many implementations, if a user measure is above or below a threshold value, the other user measure can be ignored. Additionally or alternatively, if a TD user measure is above or below a threshold value, only the TD user measure is calculated and the TI user measure is ignored. As another example of weighting the TD user measure and the TI user measure, in various implementations the weighting of the TI user measure can be greater when at least a portion (e.g., non-invocation portion) of a spoken utterance is of at least a threshold length (e.g., 4 seconds and/or 3 words) than when the at least a portion is not at least the threshold length.

At block 310, the system generates responsive content that is responsive to the spoken utterance and that is customized for the particular user.

At block 312, the system transmits the responsive content to the client device. In many implementations, transmitting the responsive content to the client device causes the client device to render output based on the responsive content. The rendered content can include the responsive content itself, or a conversion of the responsive content (e.g., the responsive content can include text, and the rendered content can include generated speech for the text (e.g., generated using a text-to-speech processor)).

Figure 4:
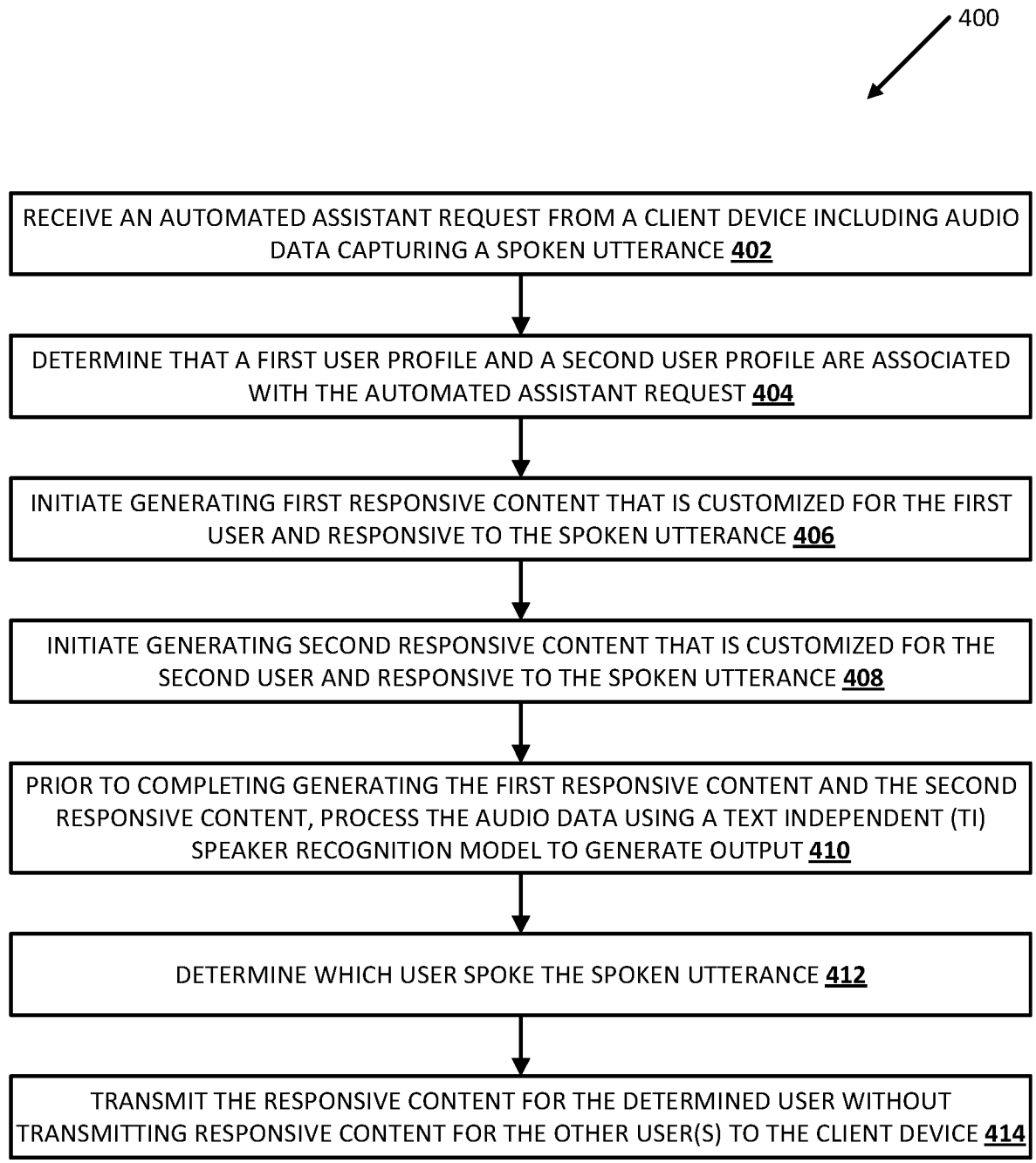
FIG. 4 is another flowchart illustrating another example process according to implementations disclosed herein.

Turning now to FIG. 4, a flowchart is provided that illustrates a process 400 of prefetching responsive content for several users of a client device prior to determining which user spoke a spoken utterance according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 400 are shown in a particular order, this is not meant to be limiting. One or more operations may be reordered, omitted, and/or added.

At block 402, the system receives an automated assistant request from a client device. In many implementations, the automated assistant request includes audio data capturing a spoken utterance.

At block 404, the system determines that a first user profile and a second user profile are associated with the automated assistant request. In many implementations, the system can determine a third user profile (and optionally fourth, fifth, etc.) is associated with the automated assistant request in addition to the first user profile and the second user profile. In many implementations, a user profile can be associated with one or more automated assistant clients. For example, a five person household may have a first client device and a second client device. Each person in the five person household can be associated with both the first client device and the second client device. In many implementations, each user profile includes a speaker embedding for the user and the speaker embeddings for all users associated with the automated assistant can be transmitted as part of the automated assistant request. In some implementations, only a subset of all available of the speaker embeddings are transmitted as part of the automated assistant request. For example, two of five available speaker embeddings can be transmitted based on TD measures for those two satisfying a threshold, while the TD measures for the other three did not.

At block 406, the system initiates generating of first responsive content that is customized for the first user and responsive to the spoken utterance.

At block 408, the system initiates generating of second responsive content that is customized for the second user and responsive to the spoken utterance. In many implementations, generation of responsive content can also be initiated for any additional users associated with the automated assistant request. For example, generation of third responsive content can be initiated, where the third responsive content is customized for a third user profile indicated in the request and is responsive to the spoken utterance.

At block 410, prior to completing generating the first responsive content and generating the second responsive content, the system processes the audio data using a TI speaker recognition model to generate output. In other words, while the system is prefetching responsive content customized for the first user and prefetching responsive content customized for the second user, the system can identify the speaker using a TI speaker recognition model. Additionally or alternatively, the system can prefetch responsive content customized for any additional user associated with the client device (e.g., prefetching responsive content customized for a third user).

At block 412, the system determines which user spoke the spoken utterance. For example, the system can determine the first user spoke the spoken utterance by comparing the output generated at block 410 with the first user speaker embedding.

At block 414, the system transmits the responsive content to the client device for the user determined to have spoken the spoken utterance at block 412 without transmitting responsive content for the other user(s). For example, if the system determines the first user spoke the spoken utterance at block 412, the system transmits the responsive content customized for the first user to the client device without transmitting responsive content customized for the second user (as well as without transmitting responsive content for any additional user(s)). Additionally or alternatively, the system causes the client device to render output based on the responsive content for the determined user. For example, the system causes the client device to render output based on the first responsive content if the system determined the first user spoke the spoken utterance at block 412.

Figure 5:
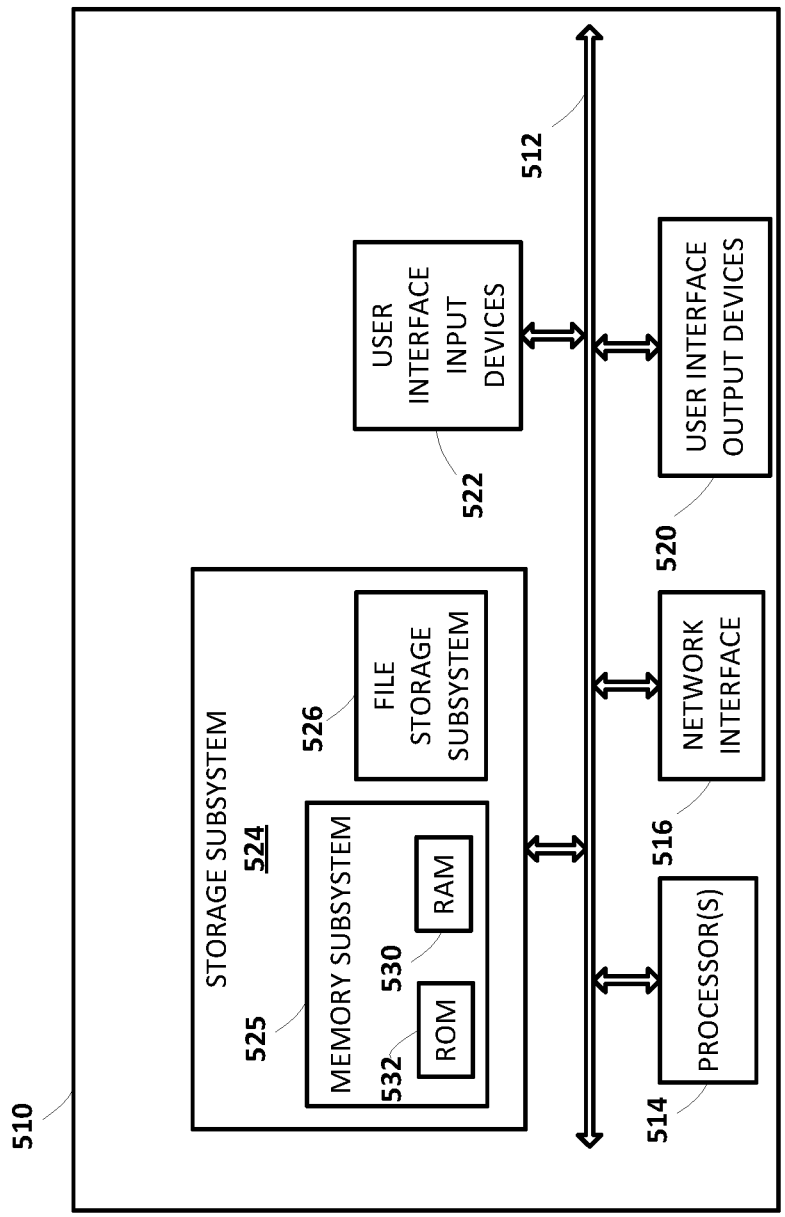
FIG. 5 is a block diagram illustrating an example architecture of a computing device.

FIG. 5 is a block diagram of an example computing device 510 that may optionally be utilized to perform one or more aspects of techniques described herein. In some implementations, one or more of a client computing device, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of one or more of the processes of FIGS. 2-4, as well as to implement various components depicted in FIG. 1.

These software modules are generally executed by processor 514 alone or in combination with other processors. Memory 525 used in the storage subsystem 524 can include a number of memories including a main random access memory ("RAM") 530 for storage of instructions and data during program execution and a read only memory ("ROM") 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving at a computing system, from a client device remote from the computing system and via a network, an automated assistant request that includes:
      audio data that captures spoken input of a user, wherein the audio data is captured at one or more microphones of the client device, and
      a text dependent (TD) user measure generated locally at the client device using a TD speaker recognition model stored locally at the client device and using a TD speaker embedding stored locally at the client device, the TD speaker embedding being for a particular user;
   processing at least a portion of the audio data using a text independent (TI) speaker recognition model to generate TI output;
   determining, at the computing system, a TI user measure by comparing the TI output with a TI speaker embedding that is associated with the automated assistant request, and that is for the particular user;
   determining, at the computing system, whether the particular user spoke the spoken input using both the TD user measure generated at the client device, and the TI user measure generated at the computing system; and
   in response to determining the spoken input is spoken by the particular user:

causing the client device and/or an additional device to perform one or more actions based on the spoken input.

2. The method of claim 1, wherein causing the client device and/or the additional device to perform one or more actions based on the spoken input comprises:
   determining the one or more actions based on the automated assistant request; and
   causing the automated assistant client to perform the one or more actions.

3. The method of claim 1, wherein causing the client device and/or the additional device to perform one or more actions based on the spoken input comprises:
   determining the one or more actions based on the automated assistant request;
   determining whether the particular user is authorized to perform the one or more actions; and
   in response to determining the particular user is authorized to perform the one or more actions, causing the client device and/or the additional client device to perform the one or more actions.

4. The method of claim 1, wherein the automated assistant request further received from the client device via the network further includes the TI speaker embedding for the particular user.

5. The method of claim 1, wherein determining whether the particular user spoke the spoken input using both the TD user measure and the TI user measure comprises:
   determining a particular user probability measure which indicates the probability the particular user spoken the spoken input by combining the TD user measure and the TI user measure; and
   determining whether the particular user spoke the spoken input by determining whether the user probability measure satisfies a threshold.

6. The method of claim 5, wherein combining the TD user measure and the TI user measure comprises utilizing a first weight for the TD user measure in the combining and utilizing a second weight for the TI user measure in the combining.

7. The method of claim 6, further comprising:
   determining the first weight and the second weight based on the length of the audio data of the spoken input.

8. The method of claim 6, further comprising:
   determining the first weight and the second weight based on a magnitude of the TD user measure.

9. A non-transitory computer-readable storage medium storing instructions executable by one or more processors of a computing system to perform a method of:
   receiving at the computing system, from a client device remote from the computing system and via a network, an automated assistant request that includes:
      audio data that captures spoken input of a user, wherein the audio data is captured at one or more microphones of the client device, and
      a text dependent (TD) user measure generated locally at the client device using a TD speaker recognition model stored locally at the client device and using a TD speaker embedding stored locally at the client device, the TD speaker embedding being for a particular user;
   processing at least a portion of the audio data using a text independent (TI) speaker recognition model to generate TI output;
   determining, at the computing system, a TI user measure by comparing the TI output with a TI speaker embedding that is associated with the automated assistant request, and that is for the particular user;
   determining, at the computing system, whether the particular user spoke the spoken input using both the TD user measure generated at the client device, and the TI user measure generated at the computing system; and
   in response to determining the spoken input is spoken by the particular user:
      causing the client device and/or an additional device to perform one or more actions based on the spoken input.

10. The non-transitory computer-readable storage medium of claim 9, wherein causing the client device and/or the additional device to perform one or more actions based on the spoken input comprises:
    determining the one or more actions based on the automated assistant request; and
    causing the automated assistant client to perform the one or more actions.

11. The non-transitory computer-readable storage medium of claim 9, wherein causing the client device and/or the additional device to perform one or more actions based on the spoken input comprises:
    determining the one or more actions based on the automated assistant request;
    determining whether the particular user is authorized to perform the one or more actions; and
    in response to determining the particular user is authorized to perform the one or more actions, causing the client device and/or the additional client device to perform the one or more actions.

12. The non-transitory computer-readable storage medium of claim 9, wherein the automated assistant request received from the client device via the network further includes the TI speaker embedding for the particular user.

13. The non-transitory computer-readable storage medium of claim 9, wherein determining whether the particular user spoke the spoken input using both the TD user measure and the TI user measure comprises:
    determining a particular user probability measure which indicates the probability the particular user spoken the spoken input by combining the TD user measure and the TI user measure; and
    determining whether the particular user spoke the spoken input by determining whether the user probability measure satisfies a threshold.

14. The non-transitory computer-readable storage medium of claim 13, wherein combining the TD user measure and the TI user measure comprises utilizing a first weight for the TD user measure in the combining and utilizing a second weight for the TI user measure in the combining.

15. The non-transitory computer-readable storage medium of claim 14, wherein the method further includes determining the first weight and the second weight based on the length of the audio data of the spoken input.

16. The non-transitory computer-readable storage medium of claim 14, wherein the method further includes determining the first weight and the second weight based on a magnitude of the TD user measure.

17. A computing system, comprising:
    one or more processors, and
    memory configured to store instructions that, when executed by the one or more processors, cause the one or more processors to perform a method that includes:

receiving, from a client device remote from the computing system and via a network, an automated assistant request that includes:
   audio data that captures spoken input of a user, wherein the audio data is captured at one or more microphones of the client device, and
   a text dependent (TD) user measure generated locally at the client device using a TD speaker recognition model stored locally at the client device and using a TD speaker embedding stored locally at the client device, the TD speaker embedding being for a particular user;
processing at least a portion of the audio data using a text independent (TI) speaker recognition model to generate TI output;
determining, at the computing system, a TI user measure by comparing the TI output with a TI speaker embedding that is associated with the automated assistant request, and that is for the particular user;
determining, at the computing system, whether the particular user spoke the spoken input using both the TD user measure generated at the client device, and the TI user measure generated at the computing system; and
in response to determining the spoken input is spoken by the particular user:
   causing the client device and/or an additional device to perform one or more actions based on the spoken input.

18. The computing system of claim 17, wherein causing the client device and/or the additional device to perform one or more actions based on the spoken input comprises:
   determining the one or more actions based on the automated assistant request; and
   causing the automated assistant client to perform the one or more actions.

19. The computing system of claim 17, wherein causing the client device and/or the additional device to perform one or more actions based on the spoken input comprises:
   determining the one or more actions based on the automated assistant request;
   determining whether the particular user is authorized to perform the one or more actions;
   in response to determining the particular user is authorized to perform the one or more actions, causing the client device and/or the additional client device to perform the one or more actions.

20. The computing system of claim 17, wherein the automated assistant request received from the client device via the network further includes the TI speaker embedding for the particular user.

* * * * *